United States Patent
Lee

(10) Patent No.: US 9,648,178 B2
(45) Date of Patent: May 9, 2017

(54) EMBEDDED JOB ACCOUNTING SYSTEM AND METHOD

(71) Applicants: Kabushiki Kaisha Toshiba, Minato-ku (JP); Toshiba TEC Kabushiki Kaisha, Shinagawa-ku (JP)

(72) Inventor: Sheng Lee, Irvine, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 14/859,522

(22) Filed: Sep. 21, 2015

(65) Prior Publication Data

US 2016/0286060 A1    Sep. 29, 2016

Related U.S. Application Data

(60) Provisional application No. 62/137,409, filed on Mar. 24, 2015, provisional application No. 62/181,294, filed on Jun. 18, 2015.

(51) Int. Cl.
*G06F 3/12*    (2006.01)
*H04N 1/00*    (2006.01)

(52) U.S. Cl.
CPC ....... *H04N 1/00347* (2013.01); *G06F 3/1207* (2013.01); *G06F 3/1253* (2013.01); *G06F 3/1256* (2013.01); *G06F 3/1273* (2013.01); *G06F 3/1284* (2013.01); *G06F 3/1287* (2013.01); *H04N 1/00244* (2013.01); *H04N 2201/0031* (2013.01); *H04N 2201/0032* (2013.01); *H04N 2201/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0079800 A1* | 4/2010 | Muto | .................. | H04N 1/32106 358/1.15 |
| 2011/0304878 A1* | 12/2011 | Yanazume | ............ | G06F 3/1211 358/1.15 |
| 2011/0320952 A1* | 12/2011 | Kataoka | .............. | H04L 41/0253 715/735 |

* cited by examiner

*Primary Examiner* — Henok A Shiferaw
(74) *Attorney, Agent, or Firm* — Ulmer & Berne LLP

(57) ABSTRACT

A document processing system and method includes a first document processing device configured to send a job completion notification subscription, user account information, charge account information, and usage restriction information to a second document processing device, and in response receive job usage information from the second document processing device for each document processing operation completed by the second document processing device, such as printing, scanning, photocopying, and faxing. The first document processing device updates the user account, charge account, and usage restriction information based on the received job usage information, and sends updated user account, charge account, and usage restriction information to the second document processing device.

20 Claims, 7 Drawing Sheets

EMBEDDED JOB ACCOUNTING SYSTEM AND METHOD

TECHNICAL FIELD

The subject application teaches embodiments that relate generally to job accounting relative to multiple, networked devices.

SUMMARY

In an example embodiment, a document processing device includes a network interface capable of communicating with a second document processing device or any computing device of a system administrator, and a processor configured to receive configuration information from the second document processing device or system administrator. The configuration information includes instructions for setting the document processing device to a child or parent status. The document processing device monitors document processing operations and produces job usage information for each job. When the document processing device is set to child status, the processor receives a job completion notification subscription from the second document processing device, and sends a job completion notification and job usage information to the second document processing device for each completed document processing job. When the document processing device is set to parent status, the processor sends a job completion notification subscription to the second document processing system, and receives a job completion notification and job usage information from the second document processing device for each completed document processing job. Example document processing operations include printing, scanning, photocopying, and faxing. In an embodiment, when the document processing device is set to parent status, the processor updates user account information, charge account information, and/or usage accountability and restriction information based on the received job usage information and sends the updated information to the second document processing device. In an embodiment, when the document processing device is set to parent status, the processor polls the second document processing device for the job usage information in response to receiving the job completion notification. In an embodiment, when the document processing device is set to parent status, the processor sends configuration information to the second document processing device. Example configuration information includes user account information, charge account information, and/or usage accountability and restriction information. In an embodiment, when the document processing device is set to parent status, the processor sends a job completion notification subscription to the document processing system, and receives a job completion notification and job usage information from the document processing device for each completed document processing job. In an embodiment, when the document processing device is set to parent status, the processor aggregates job usage information from the output managers of the document processing device and second document processing device as job accounting data and sends the job accounting data to a billing server. In an embodiment, the network interface is further capable of communicating with user computing devices and receiving document processing jobs from users. In an embodiment, the processor determines whether to complete a document processing job from a user based at least in part on either the user account information, the charge account information, or the usage accountability and restriction information.

In an example embodiment, a document processing system includes a plurality of child multifunction peripherals and a parent multifunction peripheral. Each child multifunction peripheral receives job completion notification subscriptions, user account information, charge account information, and usage information from the parent multifunction peripheral. Each child multifunction peripheral monitors document processing operations and produces job usage information for each completed document processing operation. Each child multifunction peripheral sends a job completion notification and job usage information to the parent multifunction peripheral for each completed document processing operation. The parent multifunction peripheral receives configuration information, and sends job completion notification subscriptions, user account information, charge account information, and usage information to each child multifunction peripheral. The parent multifunction peripheral receives job completion notifications and job usage information from each of the plurality of child multifunction peripherals. The parent updates the user account information, charge account information, and usage information based on the received job usage information, and sends the updated user account information, charge account information, and usage information to each of the child multifunction peripherals.

In an example embodiment, a method includes receiving configuration information that sets the document processing device to parent status and identifies a second document processing device to be set to child status. The method further includes sending at least a subset of the configuration information to the second document processing device, including configuration information that sets the second document processing device to child status. The method further includes sending a job completion notification to the second document processing device, receiving a job completion notification from the second document processing device, and receiving job usage information from the second document processing device for each completed job. Example jobs can be document processing operations such a printing, scanning, photocopying, or faxing. In an embodiment, the method further includes querying the second document processing device in response to receiving the job completion notification. Example configuration information includes user and quota information such as user account information, charge account information, and/or usage accountability and restriction information. In an embodiment, the method further includes receiving a job initiated by a user and determining whether to complete the job based at least in part on the user and quota information. In an embodiment, the method further includes updating the user and quota information based at least in part on the received job usage information, and sending the updated user and quote information to the second document processing device. In an embodiment, the method further includes sending a job completion notification subscription to the output manager of the document processing device, receiving a job completion notification from the output manager, and receiving job usage information for each completed job. In an embodiment, the method further includes aggregating usage information from the document processing device and the second document device into job accounting data and sending the job accounting date to a billing server. Example job account data includes page count data.

BACKGROUND

Document processing devices are in widespread use in many businesses and academic settings. Such devices include copiers, scanners, printers and facsimile machines. Today, one or more functions associated with such devices are combined in a single unit, referred to as multifunction peripheral ("MFP").

A typical small or medium sized business or academic unit may own one or several MFPs. MFPs are typically network connected to allow users to print remotely from their computers, scan documents suitably sent to a user's computer or a third party's computer (for example via email), copy documents, or fax documents to other people. MFPs are generally designed to function independently, with each MFP maintaining its own user and usage quota database for performing authentication and usage accountability for users using the MFP. There is generally no coordination between MFPs for authentication and job accounting.

Third party vendors, such as Pharos™ and PaperCut™, provide solutions for centrally managing jobs, tracking usage for a number of MFPs, and enforcing usage quotas among those MFPs. However, third party solutions require a dedicated server for performing those tasks. A dedicated server not only increases management costs, but also introduces a potential point of failure in the network. In some instances, the dedicated server may be managed by a third party, further complicating management for IT professionals within an organization. Also, depending upon the capabilities of the MFP and the configuration of the network, users may be able bypass a third party's dedicated server and print to a MFP directly, which can result in quotas not being enforced properly or job accounting discrepancies that must be rectified.

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

The systems and methods disclosed herein describe an embedded job accounting system for a multifunction peripheral ("MFP"). Embedding a job accounting system into an MFP suitably achieves the same goals for usage accountability and restriction without requiring an additional dedicated server. Advantageously, this reduces the costs associated with managing a dedicated server, removes a potential point of failure in the network, and because the job accounting is performed on the MFPs, and not a separate dedicated server, users cannot accidentally or purposefully bypass the job accounting functionality by sending jobs to an MFP directly.

Figure 1:
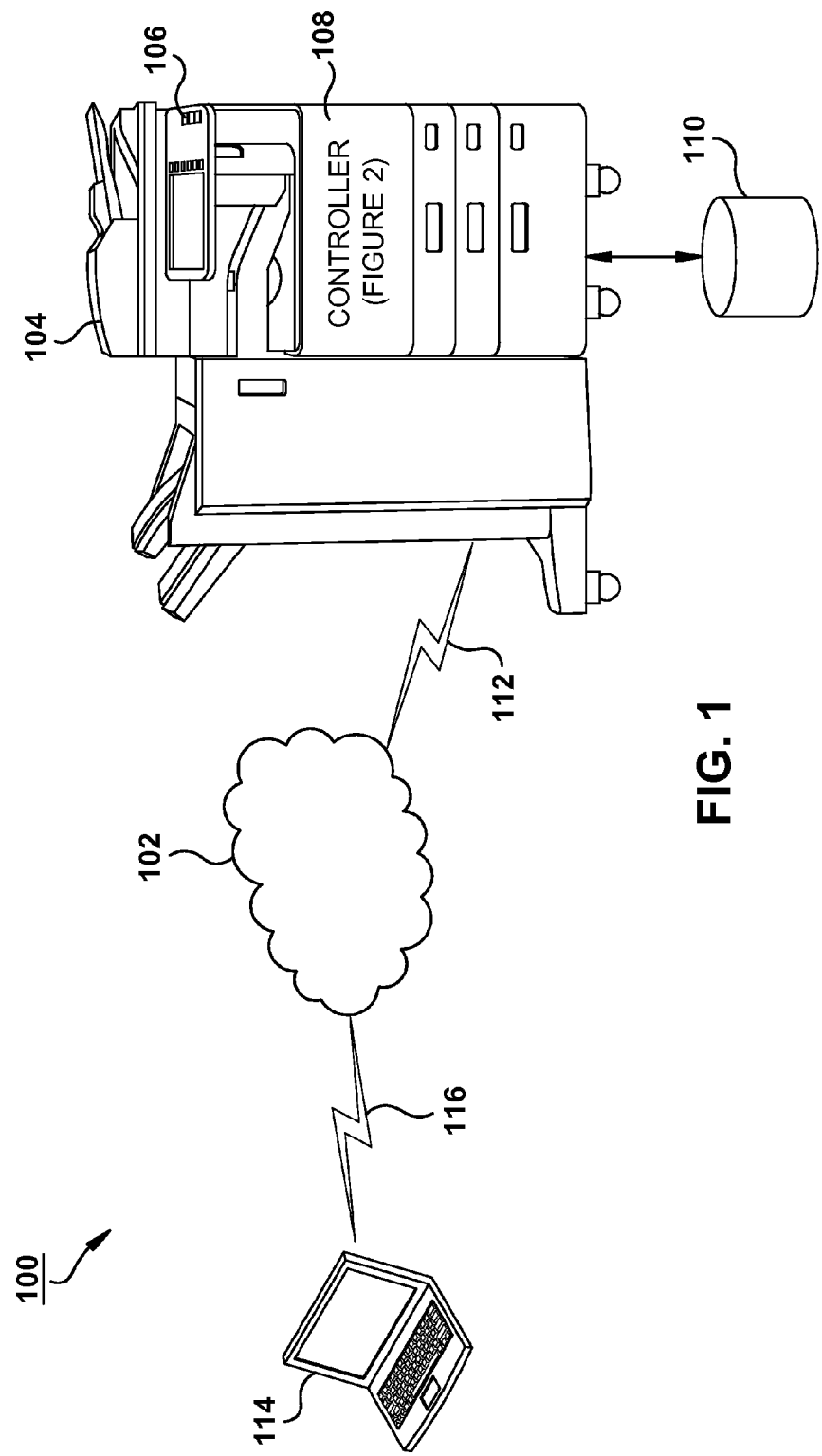
FIG. 1 is a diagram of document processing system that includes a multifunction peripheral.

Turning to FIG. 1, illustrated is example embodiment of a document processing system 100 that includes a network 102 that is in data communication with one or more document processing devices such as that illustrated by document processing device 104, suitably comprised of an MFP as illustrated. MFP 104 is suitably operable for printing, faxing, scanning, copying, e-mailing, or any other document processing operation will be understood by one of ordinary skill in the art. In the illustrated embodiment, MFP 104 includes a user interface 106. Operation of the device is suitably managed by an embedded controller 108 and embedded data storage 110 as will be detailed further below.

In the example embodiment of FIG. 1, MFP 104 is coupled for data communication 112 with network 104, suitably comprised of a local area network (LAN), a remote local area network (RLAN), a wide area network (WAN) which may comprise the Internet, or any combination thereof. In the example embodiment of FIG. 1, a computer, terminal, workstation, tablet computer, smartphone, or the like, such as that illustrated by computer 114 is also suitably placed in data communication 116 with network 102. Computer 114 suitably provides an interface for an operator or technician to access MFP 104 for control, administration or accounting relative to device operation.

Figure 2:
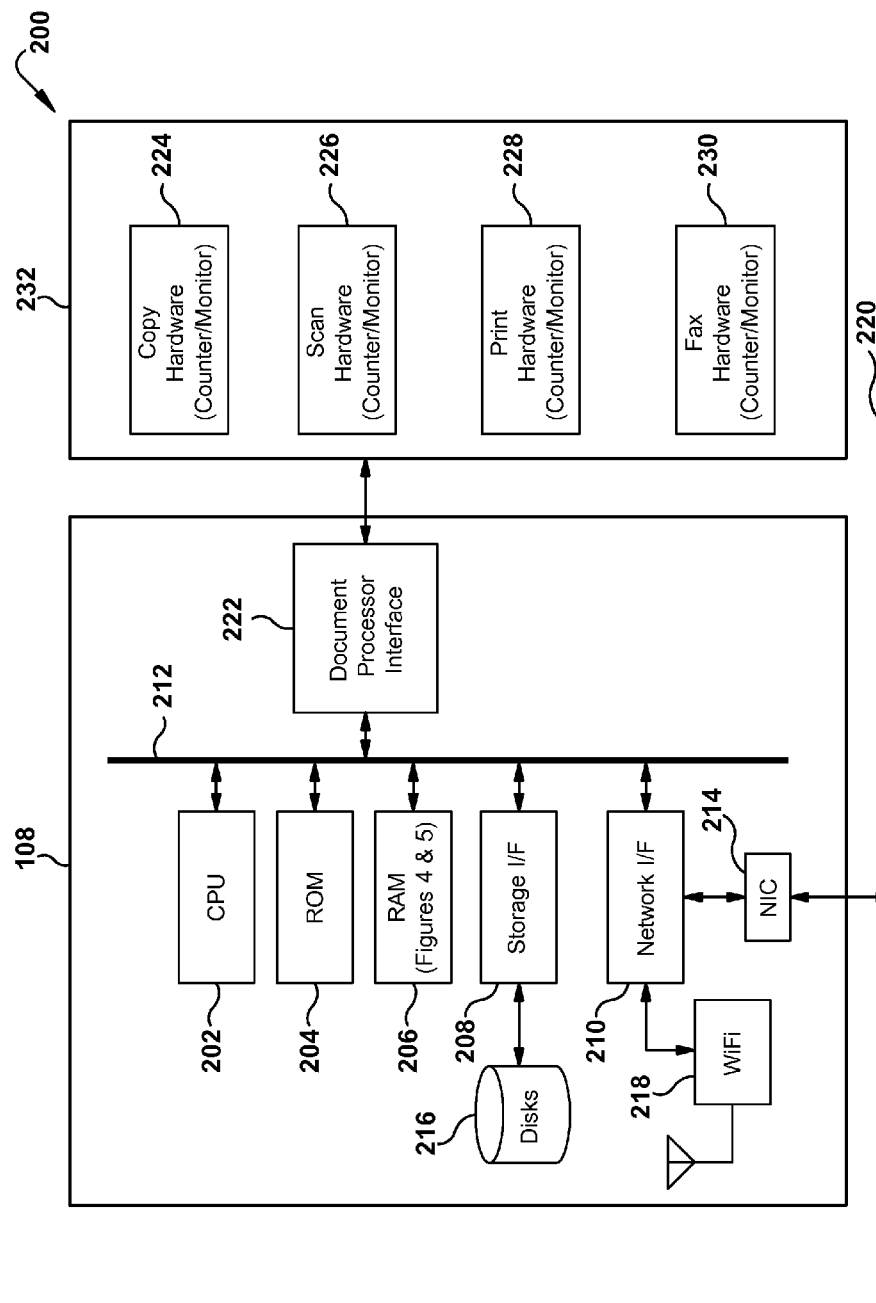
FIG. 2 is a block diagram of components of a multifunction peripheral.

Turning now to FIG. 2, illustrated are functional components 200 suitably comprising a multifunctional peripheral such as MFP 104 of FIG. 1. Included is an example embodiment of controller 108 which is suitably comprised of a computer. Included in example controller 108 are one or more processors, such as illustrated by central processor unit (CPU) 202. Also included are non-volatile memory, such as read-only memory (ROM) 204, random access memory (RAM) 206, a storage interface 208 and a network interface 210. In the example embodiment, CPU 202, ROM 204, RAM 206, storage interface 208 and network interface 210 are in mutual data communication via bus 212. Storage interface 208 facilitates data access with a bulk data storage, such as one or more disks 216, or any other suitable data storage such as a flash drive, CD, DVD or the like. Network interface 210 suitably provides for external data communication, such as with a network interface connection (NIC) 214 or WiFi interface 218. NIC 214 or WiFi interface 218 suitably provide for connection to an associated network 220.

In the example embodiment of FIG. 2, a document processor interface 222 is also in data communication with bus 212, and provides a gateway to copy hardware 224, scan hardware 226, print hardware 228 and fax hardware 230 which together comprise MFP functional hardware 232. MFP functional hardware 232 suitably includes embedded monitors, such as resource monitors or counters to facilitate metering or maintenance intervals as will be detailed further below.

Figure 3:
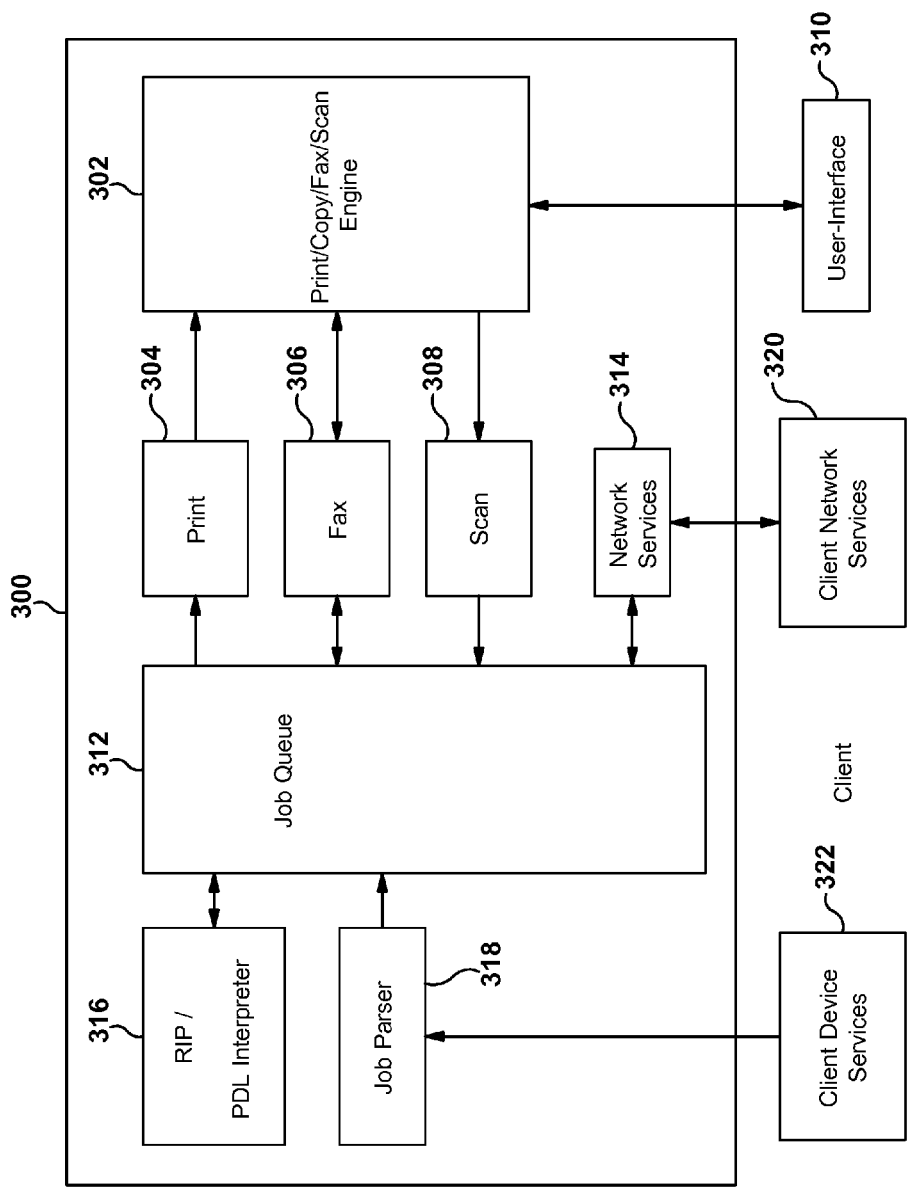
FIG. 3 is a block diagram of functional components of a multifunction peripheral.

Turning now to FIG. 3, illustrated is a functional block diagram 300 of an example MFP. Included is a print/copy/scan engine 302 which interfaces with print control 304, fax control 306, and scan control 308, all of which are suitably interfaced with job queue 312. Print/copy/scan engine 302 is suitably provided with user access via user interface 310. Job queue 312 is suitably interfaced with raster image processor (RIP) and page description language (PDL) functionality 316, as well as job parser 318. Job queue 312 is also suitably interfaced with network services 314, which in turn is interfaced with client network services 320. Job parser 318 is suitably interfaced with client device services 322.

Figure 4:
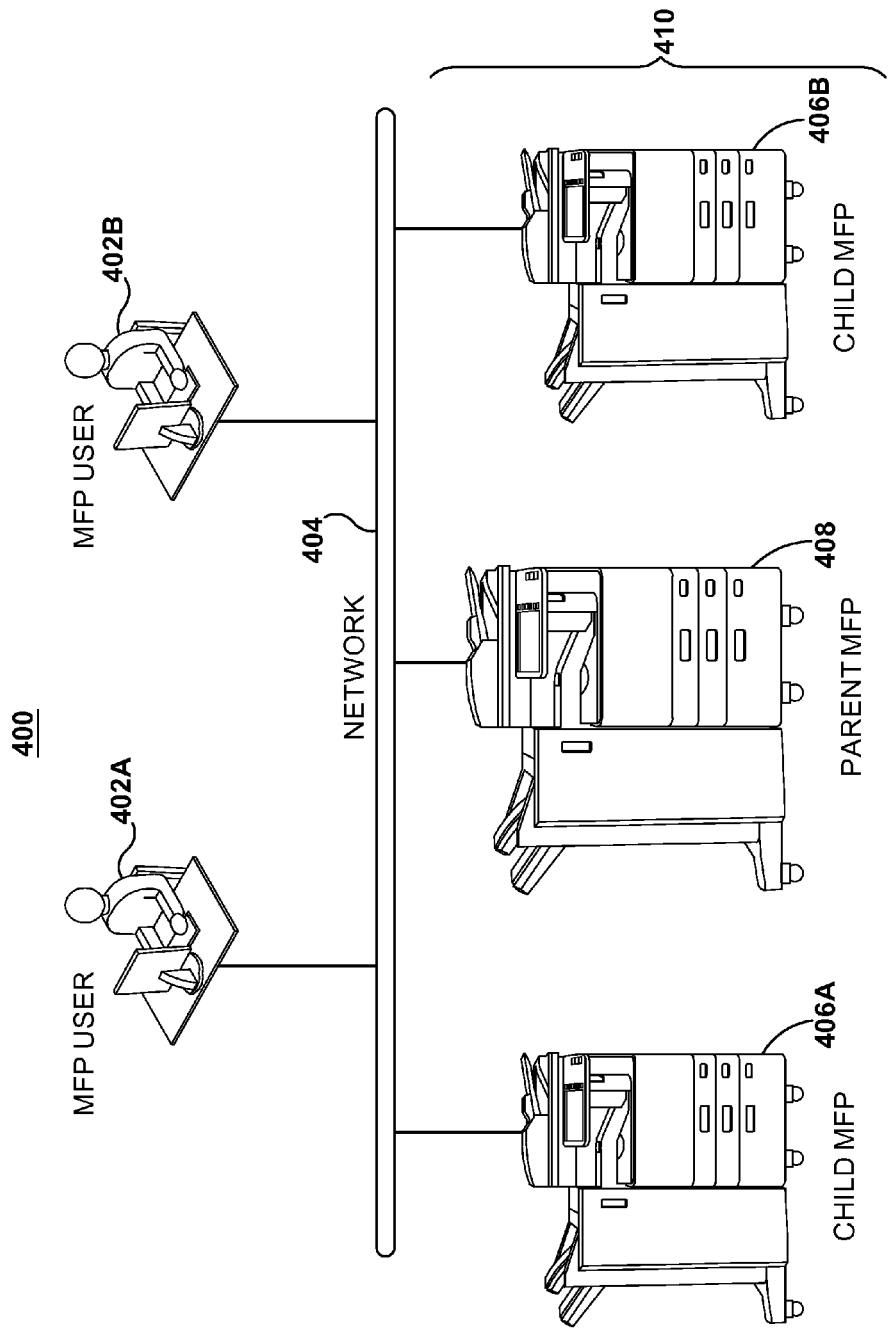
FIG. 4 is a diagram of an embedded job accounting system according to an embodiment of the disclosure.

Referring now also to FIG. 4, an example embedded job accounting system 400 is presented. In the embedded job accounting system 400, a first user 402A and a second user 402B (collectively, users 402) suitably sends one or more jobs across a network, for example local network 404, to a multifunction peripheral (MFP 410) such as child MFP 406A or child MFP 406B (collectively, child MFP 406), or parent MFP 408. The job accounting functionality is performed by the parent MFP 408, which governs each of the child MFPs 406. The job accounting functionality that is performed by the parent MFP 408 is transparent to the users 402. Each MFP 410, whether a child MFP 406 or a parent MFP 408, is presented to the user 402 as an MFP 410 that has the particular printing, scanning, email, and faxing capabilities available on the MFP 410.

In the embedded job accounting system 400, the parent MFP 408 suitably coordinates usage and quota management for a number of child MFPs 406. In an embodiment, the parent MFP 408 suitably manages usage quotas for users 402, push user quota information to each child MFP 406, and receive usage data from each child MFP 406 as jobs are attempted, started, and/or completed on a child MFP 406. In a configuration, the usage data is sent from the child MFP 406 after each job is completed.

In an embodiment, the parent MFP 408 suitably updates usage quotas based on the usage data that is received, and push the updated user quota information to each child MFP 406. For example, after a job has been completed at the first child MFP 406A, and the usage data has been sent to the parent MFP 408, the parent MFP 408 suitably updates the usage quotas for the parent MFP 408 and push the updated usage quotas to the first child MFP 406A and second child MFP 406.

In an embodiment, the parent MFP 408 suitably collects usage information for each child MFP 406, such as the number of pages printed for one or more users 402, aggregates that usage information with usage information from the parent MFP 408, and forwards the collected usage information to a billing collection server (not shown.)

Although FIG. 4 is presented with two users 402, a parent MFP 408, and two child MFPs 406, any suitable number of users 402, parent MFPs 408, and child MFPs 406 is suitably be handled by the embedded job accounting system 400. The embedded job accounting system 400 is suitably scalable, allowing additional parent MFPs 408 to be added to share the work load of monitoring additional child MFPs 406. In a configuration, the parent MFPs 408 suitably runs independently of other parent MFPs 408. In a configuration, one or more parent MFPs 408 suitably coordinates functionality, for example by synchronizing the usage data that is collected, and synchronizing usage quotas that are sent to child MFPs 406.

Figure 5:
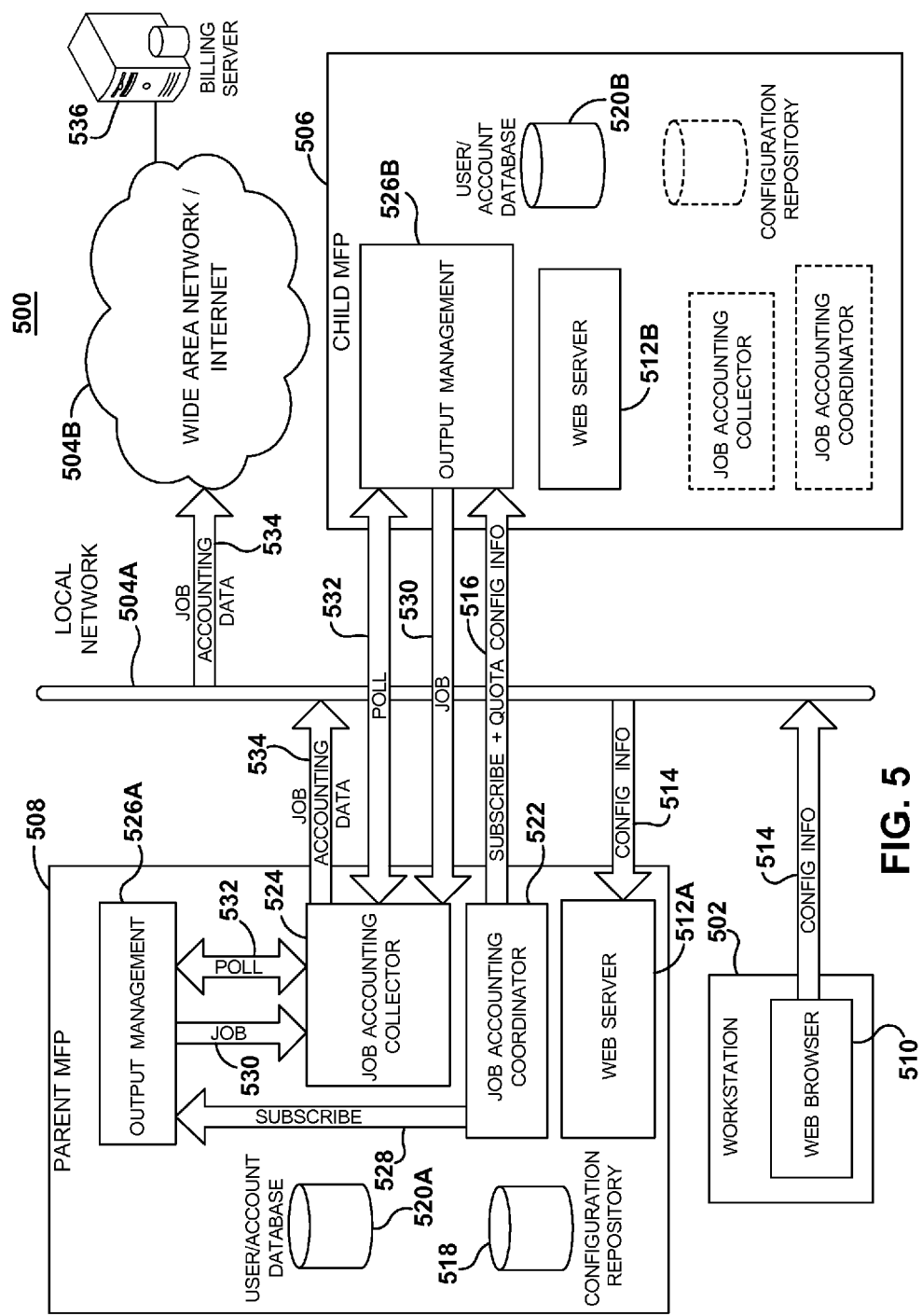
FIG. 5 is a block diagram of functional components and example communications of an embedded job account system according to an embodiment of the disclosure.

Referring now also to FIG. 5, example communications of an embedded job accounting system 500 are presented. In a configuration, a system administrator on a workstation 502 suitably opens a web browser 510 and connects to an MFP, for example parent MFP 508, across a local network 504A. The parent MFP 508 suitably executes a web server 512A to accept incoming HTTP (Hypertext Transfer Protocol) or HTTPS (Hypertext Transfer Protocol Secured) connections as is known in the art. The web browser 510 suitably passes configuration information 514 to the parent MFP 508 via the web server 512A of the parent MFP 508 using, for example, XML (EXtensible Markup Language). Other suitable protocols and data formats can be used as would be understood in the art.

The parent MFP 508 and child MFP 506 suitably use a similar web server 512 process which enables a system administrator to designate any MFP as a parent MFP 508, and other MFPs as child MFPs 506, or to reconfigure which MFP is the parent MFP 508 as desired. This can be particularly advantageous when a parent MFP 508 is taken out of service, as a system administrator connects to a child MFP 506 via the web server 512B and configures the child MFP 506 to become a parent MFP 508.

Configuration information 514 suitably includes defining parent-child relationships for the parent MFP 508 and child MFPs 506, the creation, deletion, or modification of charge accounts, the creation, deletion, or modification of users and the associated charge accounts, and quotas for each user and/or charge account, among other suitable configuration information. The configuration information 514 for defining parent-child relationship is suitably stored in a configuration repository 518. The user, charge account, and quota data is suitably stored in a user account database 520A. The configuration repository 518 and user account database 520A can be any suitable data store or memory, and can be the same data store or memory.

The parent MFP 508 suitably pushes the user, charge account, and quota information to each child MFP 506 as described below for the subscription message 516. For example, the job accounting coordinator 522 of the parent MFP 508 can subscribe to a child MFP 506 and push the user, charge account, and quota information to the child MFP 506, for example by sending XML pages with the user, charge account, and quota information. In this way, once the parent MFP 508 receives configuration information 514 that includes parent-child relationship and other information, the parent MFP 508 configures each child MFP 506 without requiring additional operations by the system administrator on the workstation 502.

Also, when any of the user, charge account, or quota information is updated, the parent MFP 508 suitably pushes updated user, charge account, and quota information to each child MFP 506. The user, charge account, and quota information is suitably stored in the user account database 520B of the child MFP 506 or any suitable data store or memory as described above for the parent MFP 508.

The parent MFP 508 includes a job accounting subscriber 522, a job accounting collector 524, and an output manager 526A. Each child MFP 506 includes an output manager 526B. Functionality for executing a job account subscriber, a job accounting collector, and a configuration repository also resides in the child MFP 506, but is not executed. In this way, each MFP 506, 508 suitably includes common capabilities, but only the parent MFP 508 executes certain operations.

The job accounting subscriber 522 of the parent MFP 508 sends a subscription message 516 to the output manager 526B of each child MFP 506. Once the job accounting subscriber 522 has established a communication channel with the child MFP 506 via the subscription message 516, the job accounting subscriber 522 pushes the user, charge account, and quota information described above, and subsequent updates, to the child MFP 506. Although this subscription message 516 is illustrated in FIG. 5 as a communication directly between the job accounting subscriber 522 and the output manager 526B, this is done for convenience and clarity of exposition only. Any suitable communication protocol and channel can be used. Subsequent communications described in this paper can be sent via any suitable communication channel using any suitable communication protocol.

The job accounting subscriber 522 also sends a local subscription message 528 to the output manager 526A of the parent MFP 508. The job accounting subscriber 522 suitably communicates with the output manager 526A of the parent MFP 508 and the output manager 526B of each child MFP 506 in the same basic way. This advantageously allows the output managers 526A, 526B (collectively, output managers 526) to execute the same or similar code and otherwise operate similarly. However, the job accounting subscriber 522 does not need to push the user, charge account, and quota information to the parent MFP 508, as the parent MFP 508 maintains the master version of the user, charge account, and quota information. Also, whereas the job accounting subscriber 522 communicates with a child MFP 506 across a network 504A, the job accounting subscriber 522 suitably communicates with the output manager 526A of the parent MFP 508 locally. Once subscribed, the output managers 526 wait for incoming jobs from users.

When an output manager 526 receives a job from a user, the output manager 526 authenticates the user using the user and account information in the associated user account database 520A, 520B (collectively, user account database 520) depending upon whether the output manager 526 that receives the job is on the parent MFP 508 or child MFP 506. The output manager 526 then determines whether or not to perform the job based on the quota information for the user or account that is stored in the associated user account database 520. The quota information can be rule based, for example allowing a user to print but issuing a notification first, allowing only a certain number of pages to print, etc. as would be understood in the art.

When an output manager 526 receives and processes a job for a user, the output manager 526 sends a job completion notification 530 to the job accounting collector 524. In response to the job completion notification 530, the job accounting collector 524 suitably polls 532 the output manager 526 that sent the job completion notification 530 in order to obtain additional information about the completed job, for example the user, account charged, and number of pages, among other information. In a configuration, the job completion notification 530 suitably includes all or a subset of the information obtained in the poll 532. In that configuration, the subsequent poll 532 may not be performed.

The job accounting collector 524 suitably uses the information received in the poll 532 to update the quota information for users and/or accounts, which is suitably stored in the user account database 520A. The parent MFP 508 suitably pushes the updated quota information to each child MFP 506 which is suitably stored in the user account database 520B of the child MFP 506. In this way, each user account database 520 suitably includes the same user, account, and quota information.

The job accounting collector 524 suitably aggregates the usage information and other associated information and send a job accounting report 534 to a billing server 536 or other server, which can be suitably located remotely. For example, if the MFPs 506, 508 are leased, the billing server 536 can be the lessor's server that is accessible across the Internet 506B or a private wide area network connection. In a configuration, the parent MFP 508 is suitably polled by the billing server 536.

The web server 512, job accounting subscriber 522, job accounting collector 524, and output manager 526 can each be suitable processes executing a common processor or set of processors, processes executing on independent processors, or any suitable combination thereof.

Figure 6:
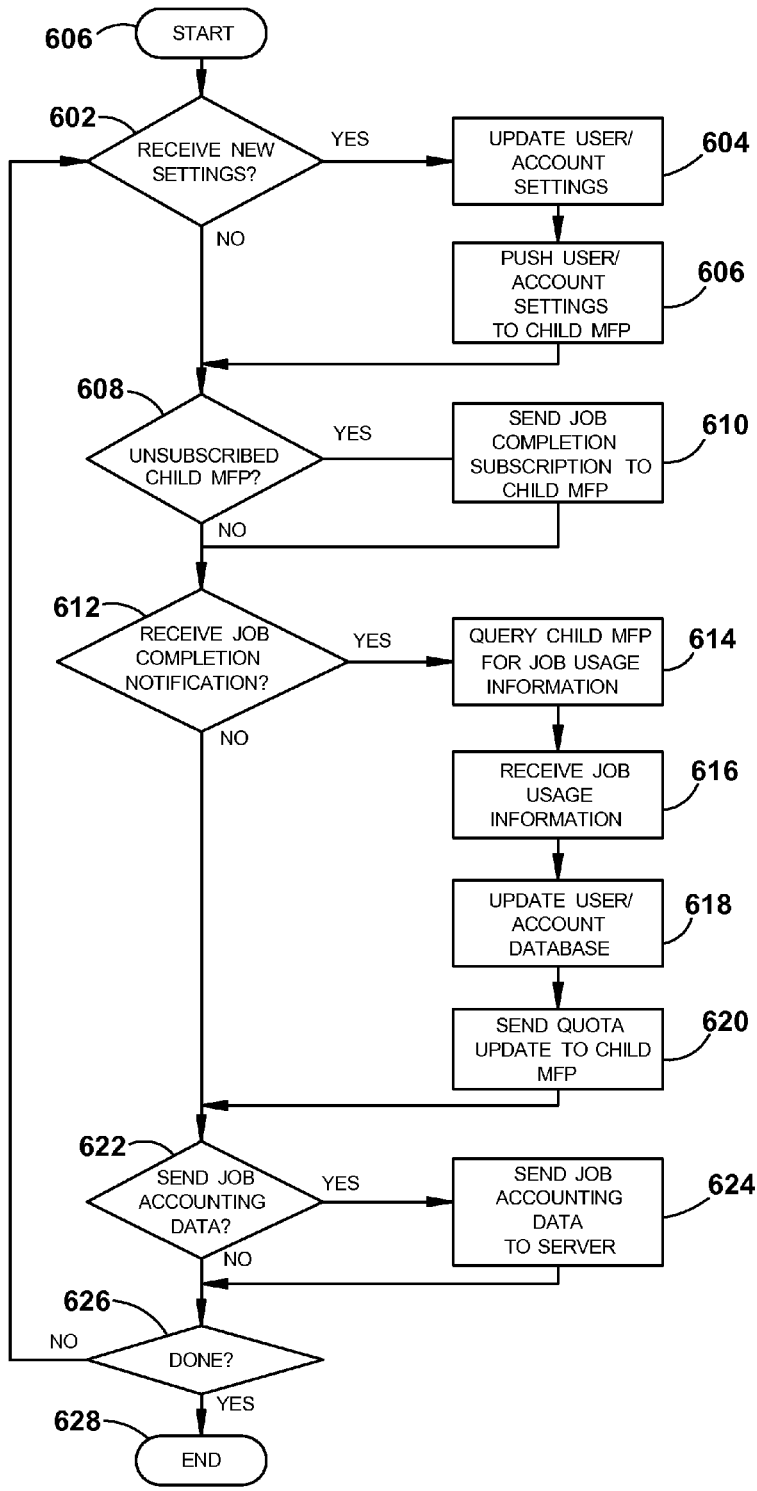
FIG. 6 is a flow diagram of an example process of a parent multifunction peripheral according to an embodiment of the disclosure.

Referring now also to FIG. 6, example processes of a parent MFP 408, 508 of an embedded job accounting system 400, 500 are presented. Processing starts at process block 600 labeled "START" and continues to decision block 602.

In decision block 602, if the parent MFP is loading the configuration information from memory, or if a system administrator has changed any configuration information, then processing continues to process block 602, otherwise processing continues to decision block 606.

In process block 604, the configuration information is updated. The configuration information includes a suitable setting that instructs the MFP to be a parent MFP, identification of associated child MFPs and addressing information that can include IP (Internet Protocol) address, MAC (Media Access Control) address or other suitable addressing information, identification of users, charge accounts, association of users with charge accounts, and rules for applying usage quotas to users and charge accounts. Processing continues to process block 606.

In process block 606, the configuration information is pushed to each child MFP associated with the parent MFP. Processing continues to decision block 608.

In decision block 608, if the parent MFP has not yet subscribed to one or more child MFPs listed in the configuration information of process block 606, or the output manager of the parent MFP, then processing continues to processing block 610, otherwise processing continues to decision block 612.

In process block 610, the job accounting subscriber of the parent MFP sends a job completion subscription to the output manager of each child MFP that is not yet subscribed to the parent MFP. The job accounting subscriber of the parent MFP suitably sends a job completion subscription to the output manager of the parent MFP. The job completion subscription instructs the output manager of each child MFP, or the output manager of the parent MFP, to send a job completion notification upon completion of user initiated jobs to the job accounting collector of the parent MFP. Processing continues to decision block 612.

In decision block 612, if the job accounting collector of the parent MFP receives a job completion notification from the output manager of the child MFP or parent MFP, then processing continues to process block 614, otherwise processing continues to decision block 622. This is the main part of the loop 602, 608, 612, 622, 626 in which the parent MFP, having sent job completion subscriptions to child MFPs, listens for job completion notifications. A job completion notification is received once the output manager of the child MFP has completed a job, such as a print job, for a user.

In process block 614, in response to receiving the job completion notification from an associated child MFP (or parent MFP), the job accounting collector of the parent MFP queries, or polls, the output manager of the associated child MFP (or parent MFP) for additional job usage information about the completed job. Processing continues to process block 616.

In process block 616, the job accounting collector of the parent MFP receives job usage information from the output manager of the child MFP (or parent MFP) in response to the query, or poll, of process block 614. The job usage information suitably includes the identity of the user who requested the job, the account to which the job was charged, and information about the job, such as the number of pages printed if the job was a print job. Other suitable information can also be received. Processing continues to process block 618.

In process block 618, the quota usage information for the user or charge account is suitably updated in the user account database based at least in part on the job usage information received in process block 616. Processing continues to process block 620.

In process block 620, the parent MFP suitably pushes the updated quota usage information to each of the child MFPs associated with the parent MFP. Processing continues to decision block 622.

In decision block 622, if the parent MFP receives a request for usage information from a billing server, or if a rule is triggered to send updated usage information to a billing server, then processing continues to process block 624, otherwise processing continues to decision block 626.

In process block 624, the usage data for the parent MFP and each child MFP is suitably aggregated and sent as job accounting data to a billing server. Processing continues to decision block 626.

In decision block 626, if the parent MFP process is terminated, then processing terminates at end block 628 labeled "END", otherwise processing continues to decision block 602 to receive updated configuration information and loop through decision blocks 608, 612, and 622 to subscribe child MFPs, listen for job completion notifications, and send job accounting data.

Figure 7:
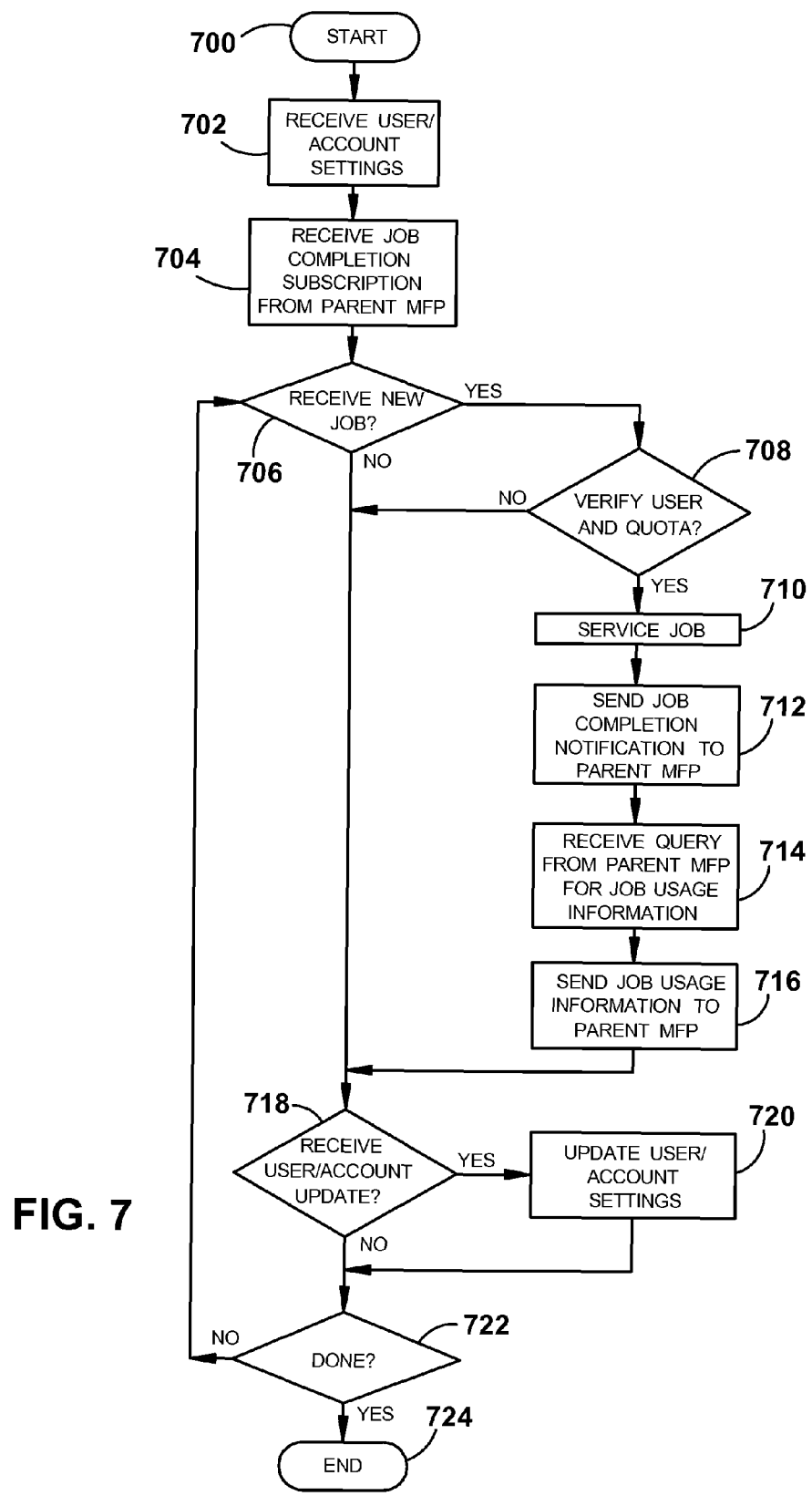
FIG. 7 is a flow diagram of an example process of a child multifunction peripheral according to an embodiment of the disclosure.

Referring now also to FIG. 7, example processes of a child MFP 406, 506 of an embedded job accounting system 400, 500 are presented. Processing starts at process block 700 labeled "START" and continues to decision block 702.

In process block 702, the child MFP receives configuration information from a parent MFP. The configuration information suitably includes a setting that instructs the MFP to be a parent MFP, identification of associated child MFPs and addressing information that suitably includes IP (Internet Protocol) address, MAC (Media Access Control) address or other suitable addressing information, identification of users, charge accounts, association of users with charge accounts, and rules for applying usage quotas to users and charge accounts. Processing continues to process block 704.

In process block 704, the output manager of the child MFP receives a job completion subscription from the job accounting subscriber of the parent MFP. Processing continues to decision block 706.

In decision block 706, if the output manager of the child MFP receives a job request from a user, then processing continues to decision block 708, otherwise processing continues to decision block 716. This is the main part of the loop 706, 718, 722 in which the child MFP awaits jobs from users or configuration and quota usage updates from the parent MFP.

In decision block 708, if the output manager of the child MFP suitably verifies the user and charge account, and if the job request falls within the usage quota rules for the user or charge account, the processing continues to process block 710 to service the job request, otherwise the job is rejected and processing continues to decision block 718.

In process block 710, the output manager of the child MFP services the job request from the user and creates a record of the job usage information. Processing continues to process block 712.

In process block 712, the output manager of the child MFP sends a job completion notification upon completion of user initiated jobs to the job accounting collector of the parent MFP. Processing continues to decision block 714.

In process block 714, in response to sending the job completion notification, the output manager of the child MFP receives a query or poll from the job accounting collector of the parent MFP for additional job usage information about the completed job. Processing continues to process block 716.

In process block 716, the output manager of the child MFP sends job usage information to the job accounting collector of the parent MFP in response to the query, or poll, of process block 714. The job usage information suitably includes the identity of the user who requested the job, the account to which the job was charged, and information about the job, such as the number of pages printed if the job was a print job. Other suitable information can also be received. Processing continues to decision block 718.

In decision block 718, if the output manager of the child MFP receives updated user, charge account, or usage quota information from the job accounting collector of the parent MFP, then processing continues to processing block 720, otherwise processing continues to decision block 722.

In process block 720, the received user, charge account, or usage quota information from the parent MFP is updated in the user account database of the child. This information is used by the output manager of process block 708 to authenticate users and verify quotas prior to servicing user initiated jobs. Processing continues to decision block 722.

In decision block 722, if the child MFP process is terminated, then processing terminates at end block 724 labeled "END", otherwise processing continues to decision block 706 to receive new jobs from users and loop through decision block 718 to receive updated configuration information.

The output manager of the parent MFP suitably operates similarly to the output manager of the child MFP as described in process and decision blocks 700-724 above. For example, the output manager of the parent MFP suitably receives a job completion subscription from the parent MFP as in process block 704, wait for a new user initiated job as in decision block 706, verify usage quotas as in decision block 708, service jobs as in process bock 710, send job completion notification as in process block 712, receive a query as in process block 714, and send job usage information as in process block 716. However, because the output manager of the parent MFP resides on the parent MFP, the output manager can directly access the user account database of the parent MFP. Therefore, process and decision blocks 702, 718, and 720, which describe processes for updating the user account database, are unnecessary for the output manager of the parent MFP.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A document processing device comprising:
   a network interface operable to communicate with one or more of
      a second document processing device across an associated network, or
      a computing device associated with a system administrator; and
   a processor in data communication with the network interface and configured to
      receive configuration information from at least one of the computing device of the system administrator, or the second document processing device, and
      wherein the configuration information includes instructions to set the document processing device to a child status or a parent status;
      monitor document processing operations of the document processing device;
      produce job usage information for each completed user initiated job on the document processing device; and
      when the document processing device is set to child status,
         receive a job completion notification subscription from a parent document processing device,
         send a job completion notification to the parent document processing device for each of a plurality of completed user initiated
         jobs in accordance with the job completion notification subscription, and
         send the job usage information to the parent document processing device, and
      when the document processing device is set to parent status,
         send a job completion notification subscription to a child document processing device,
         receive, from the child document processing device, a job completion notification for each completed user initiated job on the child document processing device, and
         receive, from the child document processing device, job usage information for each of a plurality of completed user initiated jobs on the child document processing device.

2. The document processing device of claim 1 wherein each job is a document processing operation selected from the group consisting of printing, scanning, photocopying, and faxing operations.

3. The document processing device of claim 1 wherein when the document processing device is set to parent status the processor is further configured to
   update, based on the received job usage information, one or more of the
      user account information,
      charge account information, or
      usage accountability and restriction information, and
   send, to the child document processing device, one or more of the
      user account information,
      charge account information, or
      usage accountability and restriction information.

4. The document processing device of claim 1 wherein when the document processing device is set to parent status the processor is further configured to
   poll the child document processing device for the job usage information in response to receiving the job completion notification.

5. The document processing device of claim 1 wherein when the document processing device is set to parent status the processor is further configured to
   send configuration information to the child document processing device.

6. The document processing device of claim 5 wherein the configuration information sent to the child document processing device includes one or more of
   user account information,
   charge account information, or
   usage accountability and restriction information.

7. The document processing device of claim 1 wherein when the document processing device is set to parent status the processor is further configured to
   send a job completion notification subscription to an output manager of the document processing device,
   receive a job completion notification for each completed user initiated job from the output manager, and
   receive a job usage information for each completed user initiated job from the output manager.

8. The document processing device of claim 1 wherein when the document processing device is set to parent status the processor is further configured to
   aggregate job usage information from the output manager of the document processing device and job usage information from the child document processing device into job accounting data, and
   send the job accounting data to a billing server.

9. The document processing device of claim 1 wherein the network interface is further operable to
   communicate with a computing device associated with a user, and
   receive user initiated jobs across the associated network from the computing device of the user.

10. The document processing device of claim 1 wherein the processor is further configured to
    receive one or more of
       user account information,
       charge account information, or
       usage accountability and restriction information; and
    determine whether to complete a user initiated job based at least in part on one or more of the
       user account information,
       charge account information, or
       usage accountability and restriction information.

11. A document processing system comprising:
    a plurality of child multifunction peripherals configured to
       receive a job completion notification subscription from a parent multifunction peripheral,
       receive user account, charge account, and usage information from the parent multifunction peripheral,
       monitor document processing operations,
       receive a plurality of user commenced document processing operations,
       produce job usage information for each completed, user commenced document processing operation, send a job completion notification to the parent multifunction peripheral for each completed document processing operations in accordance with the job completion notification subscription, and send the job usage information to the parent multifunction peripheral; and the parent multifunction peripheral configured to receive configuration information, send a job completion notification subscription to each of the plurality of child multifunction peripherals identified in the configuration information, send user account, charge account, and usage information to each of the plurality of child multifunction peripherals, receive the job completion notifications from the plurality of child multifunction peripherals, receive the job usage information from the plurality of child multifunction peripherals, update the user account, charge account, and usage information based at least in part on the received job usage information, send updated user account, charge account, and usage information to the plurality of child multifunction peripherals.

12. A method comprising:

receiving configuration information by a document processing device, the configuration information including at least an indication that sets the document processing device to parent status, and identification of a second document processing device to be set to child status;

sending, in response to receiving the configuration information, at least a subset of the configuration information to the second document processing device including at least a second indication that sets the second document processing device to child status;

sending a job completion notification subscription to the child document processing device;

receiving a job completion notification from the child document processing device for each of a plurality of jobs in accordance with the job completion notification subscription;

receiving a job usage information for each of the plurality of jobs completed by the child document processing device.

13. The method of claim 12 wherein the job is a document processing operation selected from the group consisting of printing, scanning, photocopying, and faxing operations.

14. The method of claim 12 further comprising:

querying the child document processing device in response to receiving the job completion notification.

15. The method of claim 12 wherein the configuration information that is received by the document processing device, and the subset of the configuration information that is sent to the child document processing device, includes user and quota information selected from one or more of user account information, charge account information, or usage accountability and restriction information.

16. The method of claim 15, further comprising:

receiving a user initiated job; and determining whether to complete the user initiated job based at least in part on the user and quota information.

17. The method of claim 15 further comprising:

updating the user and quota information based at least in part on the job usage information; and sending updated user and quota information to the child document processing device.

18. The method of claim 12, further comprising:

sending a job completion notification subscription to an output manager of the document processing device;

receiving a job completion notification from the output manager;

receiving a job usage information for each job completed by the output manager.

19. The method of claim 18 further comprising:

aggregating job usage information from the output manager of the document processing device and job usage information from the child document processing device into job accounting data, and sending the job accounting data to a billing server.

20. The method of claim 19, wherein the job accounting data includes page count data.

* * * * *